(12) United States Patent
Kudelski

(10) Patent No.: US 8,874,488 B2
(45) Date of Patent: Oct. 28, 2014

(54) PROCESS FOR CARRYING OUT A TRANSACTION BETWEEN A PAYMENT MODULE AND A SECURITY MODULE

(75) Inventor: Henri Kudelski, Chexbres (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 966 days.

(21) Appl. No.: 12/528,552

(22) PCT Filed: Feb. 26, 2008

(86) PCT No.: PCT/EP2008/052285
§ 371 (c)(1),
(2), (4) Date: Aug. 25, 2009

(87) PCT Pub. No.: WO2008/104527
PCT Pub. Date: Sep. 4, 2008

(65) Prior Publication Data
US 2010/0293098 A1    Nov. 18, 2010

(30) Foreign Application Priority Data

Feb. 27, 2007 (EP) .................................... 07103102

(51) Int. Cl.
*G06Q 99/00* (2006.01)
*G07F 7/10* (2006.01)
(Continued)

(52) U.S. Cl.
CPC .......... *G07F 7/1008* (2013.01); *G06Q 20/3823* (2013.01); *G06Q 20/06* (2013.01);
(Continued)

(58) Field of Classification Search
USPC ......................................................... 705/64
See application file for complete search history.

(56) References Cited

U.S. PATENT DOCUMENTS 6,424,947 B1   7/2002 Tsuria et al.
7,676,431 B2 * 3/2010 O'Leary et al. ................. 705/39
(Continued)

FOREIGN PATENT DOCUMENTS

DE   103 54 029   7/2005
EP   1 132 875    9/2001
(Continued)

OTHER PUBLICATIONS

European Search Report issued in EP 07 10 3102: mailed Nov. 2, 2007.

(Continued)

*Primary Examiner* — James D Nigh
(74) *Attorney, Agent, or Firm* — DLA Piper LLP US

(57) ABSTRACT

This invention relates to a process for carrying out a transaction between a payment module and a security module connected to a user's unit, this process being characterized in that it comprises the following steps: entering an identifier representative of the transaction to be carried out by means of an input device; generating by the user's unit, a control message containing at least a representative code of said transaction and an identifier of the security module requiring the transaction; sending said control message to said payment module (PP); verifying in said payment module whether it is entitled to carry out the desired transaction; if the payment module is entitled to carry out this transaction, execution of the transaction, storage of the result of the transaction in said payment module and generation by the payment module, of a receipt relating to the desired transaction and to the related security module; sending said receipt to a management center; sending an unlocking code to the security module (SC) by the management center; registering the transaction in said security module.

22 Claims, 3 Drawing Sheets

(51) Int. Cl.
  *G06Q 20/06* (2012.01)
  *G06Q 20/34* (2012.01)
  *G06Q 20/36* (2012.01)
  *G06Q 20/40* (2012.01)
  *G07F 7/08* (2006.01)
  *H04N 7/16* (2011.01)
  *H04N 21/418* (2011.01)
  *H04N 21/4185* (2011.01)
  *H04N 21/4405* (2011.01)
  *H04N 21/442* (2011.01)
  *H04N 21/4623* (2011.01)
  *H04N 21/478* (2011.01)
  *H04N 21/658* (2011.01)
  *G06Q 20/38* (2012.01)

(52) U.S. Cl.
  CPC ............ *G06Q 20/341* (2013.01); *G06Q 20/363* (2013.01); *G06Q 20/382* (2013.01); *G06Q 20/40* (2013.01); *G07F 7/082* (2013.01); *G07F 7/0866* (2013.01); *G07F 7/0873* (2013.01); *H04N 7/163* (2013.01); *H04N 21/4181* (2013.01); *H04N 21/4185* (2013.01); *H04N 21/4405* (2013.01); *H04N 21/44222* (2013.01); *H04N 21/4623* (2013.01); *H04N 21/47815* (2013.01); *H04N 21/6582* (2013.01)
  USPC .......................................................... 705/64

(56) References Cited

U.S. PATENT DOCUMENTS

| | | |
|---|---|---|
| 2003/0061605 A1* | 3/2003 | Genevois et al. .................. 725/6 |
| 2003/0140004 A1* | 7/2003 | O'Leary et al. .................. 705/39 |
| 2005/0177514 A1* | 8/2005 | Sasselli ............................ 705/52 |
| 2006/0031899 A1 | 2/2006 | Rabin et al. |
| 2008/0080711 A1* | 4/2008 | Gagnon et al. ................ 380/239 |

FOREIGN PATENT DOCUMENTS

| | | |
|---|---|---|
| EP | 1 353 501 | 10/2003 |
| GB | 2 329 736 | 3/1999 |
| WO | WO 97/40616 | 10/1997 |
| WO | WO 01/52124 | 7/2001 |
| WO | WO 2005/057926 | 6/2005 |

OTHER PUBLICATIONS

International Search Report issued in International Application No. PCT/EP2008/052285, mailed Jul. 16, 2008.
Written Opinion issued in International Application No. PCT/EP2008/052285, mailed Jul. 16, 2008.
English language abstract of EP 1 353 501, published Oct. 15, 2003.
English language abstract of DE 103 54 029, published Jul. 21, 2005.

* cited by examiner

PROCESS FOR CARRYING OUT A TRANSACTION BETWEEN A PAYMENT MODULE AND A SECURITY MODULE

TECHNICAL FIELD

The present invention relates to the protection of transactions between two modules of a user, one of the modules being a payment module such as for example a pre-paid card and the other module being a security module taking over the access control to conditional access data. Such process can be applied in particular to the field of Pay-TV, to purchase events or files such as films, sport matches, music files, software applications or other such files.

PRIOR ART

In applications in which a user wishes to access conditional access data, essentially two principles are implemented to authorize this access. According to one of them, the access right is given in the form of a subscription. In this case, the user generally pays a lump sum which entitles him/her to access an entire series of events, the paid price being independent of the events actually accessed.

According to another principle, the user must acquire an entitlement for every event he/she wishes to access. This is in particular the case in the fields of Pay-TV, video-on-demand or when events are ordered in the form of impulsive purchases. In such a situation, the user generally pays an amount depending on his/her event consumption.

The amounts to be paid can be debited from an account of a registered user or be subtracted from a credit stored in a user's security module, for instance. This means that it is necessary for the user to be registered before being entitled to take advantage of this service.

In some applications, it is not desirable to force the user to give bank account details, for instance. It can be preferable to offer the users payment modules in the form of a pre-paid card giving said users the right to access certain contents whose "value" corresponds at the most to the purchase price of the pre-paid card. Notably, this allows good management of the credit consumed by the user.

The difficulty of these types of systems is to transfer a credit or an entitlement from the payment module to an adapted security module in a secure manner.

In known systems, for instance in the field of cellular telephony, it is possible to charge a credit by means of a pre-paid card. In this type of application, a message such as a SMS (short message system) is sent to a management centre, this message containing a unique identification number. By definition, when the message is sent to the management centre by means of a phone, this centre can identify the source, since it recognizes the phone number from whence this message came. The management centre verifies the message authenticity and, should this message be authentic, sends an unlocking code back. This unlocking code causes the phone to be charged with the credit. The unique number is then eliminated in such a way that sending the same number again will not credit the amount for a second time.

This kind of process does not operate in all the applications. Particularly in the field of Pay-TV, when a user wishes to obtain an amount corresponding to a particular event, the above-described process cannot manage such a demand. Indeed, when a credit is attributed to a certain user's unit, it is important to be assured that a corresponding debit has been charged on a payment module. Moreover, it is necessary that the debited module is bound to the credited module.

In the cards used in telephony, the amount is in fact not debited on the pre-paid card. In reality, the card serves only as a support for the number to be sent to the management centre, but does not include any possibility of managing an amount.

This kind of systems cannot be used for credit management in the field of the Pay-TV since in systems adapted to telephony, the authorization is either given or refused.

In the framework of a payment module capable of managing a credit, at the time of the attribution of a credit to a security module, it is important to ensure that a corresponding debit has been charged on the payment module, so as to avoid fraud. Likewise, it is important that the debited module is linked to the credited module to avoid a credit being attributed to an unauthorized person.

Therefore it is necessary to link the two cards in a secure way and to credit the security module only if the pre-paid card has already been debited.

The present processes do not ensure an optimal security during these types of transactions.

The patent application WO 01/52124 describes an electronic payment method used in a Pay-TV system. In this system, a transaction is carried out locally, the result of this transaction being stored in a decoder memory before being transmitted to the commercial access provider.

In this system, a management centre initiates a transaction by sending an authorization message EMM, which is specific for each decoder. As a result, many messages are unnecessarily sent. Moreover, a user wishing to initiate a transaction is unable to do so, but he/she must wait to receive a message. Furthermore, the transaction is not done in real time. A first step of the transaction is performed at a given time, initiated by the service provider or a management centre. Data are stored in the user's unit during this step. The second step of the transaction is performed locally in the user's unit. The aim of this process is to avoid a lot of transactions being carried out at the same time, which could overload the management centre.

DISCLOSURE OF THE INVENTION

This invention intends to avoid the drawbacks of prior art processes by developing a process in which it is possible to manage in an effective and secure way, the attribution of a credit to a security module and the debit of a corresponding amount into a payment module.

According to this process, a user having a security module can then request a credit or rights associated to an event in particular. In the case of a credit, the process allows to guarantee that an amount is only attributed to a security module if a corresponding amount has been debited from a payment module. In the case of a right, this right is generally associated to an amount. The process of the invention allows to guarantee that the right is not attributed to the security module if a corresponding amount has not been previously debited from the payment module.

In the process of the invention, a communication is established between a security module connected to a user's unit and a payment module acquired by the same user. The communication can be a two-way communication between the security module and the payment module or a one-way communication, from the payment module to the security module, depending on the chosen embodiment. At least one of the communications is made through transiting by a management centre, while the other communication, in case of a two-way exchange, is made either locally, that is to say in the user's unit, or by the intermediate of the management centre. The communication can among other, use the APDU communication protocol (Application Protocol Data Unit).

The communication between the modules allows on one hand to send a request relating to the transaction required and on the other hand to receive a relative code to this transaction, as far as the conditions to receive this code are fulfilled.

The aim of the invention is achieved by a process for carrying out a transaction between a payment module and a security module connected to a user's unit, this process being characterized in that it comprises the following steps:

- entering an identifier representative of the transaction to be carried out by means of an input device;
- generating by the user's unit, a control message containing at least a representative code of said transaction and an identifier of the security module requiring the transaction;
- sending said control message to said payment module;
- verifying in said payment module whether it is entitled to carry out the desired transaction;
- if the payment module is entitled to carry out this transaction, execution of the transaction, storage of the result of the transaction in said payment module and generation by the payment module, of a receipt relating to the desired transaction and to the related security module;
- sending said receipt to a management centre;
- sending an unlocking code to the security module by the management centre;
- registering the transaction in said security module.

The aim of the invention is also achieved by a process for carrying out a transaction between a payment module and a security module connected to a user's unit, this process being characterized in that it comprises the following steps:

- entering an identifier representative of the transaction to be carried out by means of an input device;
- generating by the user's unit, a control message containing at least a representative code of said transaction and an identifier of the security module requiring the transaction;
- sending said control message to a management centre;
- sending said control message to the payment module;
- verifying in said payment module whether it is entitled to carry out the desired transaction;
- if the payment module is entitled to carry out this transaction, execution of the transaction and transmission of a unlocking code relating to the desired transaction to the corresponding security module;
- registering the transaction in said security module.

The aim of the invention is also achieved by a process for carrying out a transaction between a payment module and a security module connected to a user's unit, this process being characterized in that it comprises the following steps:

- entering an identifier representative of the transaction to be carried out by means of an input device;
- generating by the user's unit, a control message containing at least one representative code of said transaction and an identifier of the security module requiring the transaction;
- sending said control message to a management centre;
- sending said control message to the payment module;
- verifying in said payment module whether it is entitled to carry out the desired transaction;
- if the payment module is entitled to carry out this transaction, execution of the transaction and transmission of a receipt relating to the desired transaction to the management centre;
- elaborating an unlocking code and sending the unlocking code by the management centre, to the security module;
- registering the transaction in said security module.

The aim of the invention is furthermore achieved by a process for carrying out a transaction between a payment module and a security module connected to a user's unit, this process being characterized in that it comprises the following steps:

- entering an identifier representative of the transaction to be carried out and of an identifier of the security module requiring the transaction by means of an input device;
- generating a control message containing at least one representative code of said transaction by the payment module;
- verifying in said payment module whether it is entitled to carry out the desired transaction;
- if the payment module is entitled to carry out said transaction, execution of the transaction, storage of the result of the transaction in said payment module and generation of a receipt by the payment module relating to the desired transaction and to the concerned security module;
- sending said receipt to a management centre;
- elaborating an unlocking code;
- sending of said unlocking code to the security module;
- registering the transaction in said security module.

BRIEF DESCRIPTION OF THE DRAWINGS

This invention and its advantages will be better understood with reference to the enclosed drawings and the detailed description of particular embodiments, in which.

MODES FOR CARRYING OUT THE INVENTION

Figure 1:
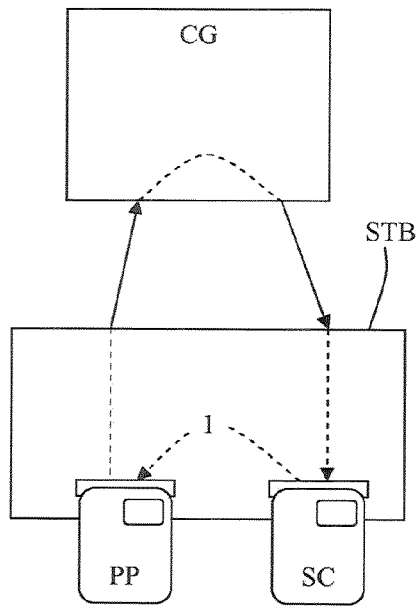
FIGS. 1 to 4 schematically represent the components used for executing different variants of the process according to the invention.

In the present invention, it is assumed that the user has a security module SC and a payment module PP. For instance, the security module can allow the user to access certain events. For instance, the payment module is intended to access events to which the security module does not give access. This payment module can, for instance, contain an amount that the user can use freely to access any event up to the limit of the stored amount. The module can also contain tokens or entitlements for an event or a series of specific events or for a given duration.

In principle, the payment module is not intended to operate alone, but requires the presence of the security module in order to work. Moreover, it is foreseen that the payment module is initialized and does not operate without this initialization. This initialization step operates in the following way:

According to a first embodiment of the invention, the user has a security module SC which gives him/her right to access certain events. He/she also has a payment module having the above-indicated functions. In this embodiment, the payment module is activated when it is introduced in a reader of the multimedia unit. To carry out this activation step, a management centre regularly sends management messages EMM.

The management centre sends an authorization message EMM giving the instruction to create an unlocking key. This unlocking key is formed from at least one random number and a monetary value, a token and/or an entitlement. The whole is encrypted by a group key Kg that can be common to all multimedia units concerned or to a part of them.

Once the unlocking key is received, it is decrypted by means of the group key and the random number is extracted. The multimedia unit verifies whether this random number has already been used or not. If it has been used, the unlocking key is rejected. If this is not the case, the amount, the token and/or the entitlement is extracted in view of its use according to the process of the invention.

According to a variant, the activation of the pre-payment card is made in the following way: the user phones the management centre and gives identification data. These data are verified in the management centre. If they correspond to a real card, the management centre prepares a management message EMM, which is generally specific to the payment module. This management message contains an unlocking key, as in the previous embodiment. In principle, this key is encrypted with the key specific to the concerned payment module, contrary to the previous embodiment where it is generally encrypted with a global key.

For instance, the identification data can be comprised of a number relating to an event, an identification number of the payment module, as well as a verification code.

FIGS. 1 to 6 schematically illustrate the transfer process according to the invention as well as the elements for carrying out this transfer process between a payment module PP and a security module SC, these two modules being connected to a user's unit such as a decoder STB for example.

As it is well known from the man skilled in the art, the security module SC can essentially be essentially realized according to four distinct forms. One of these forms is a microprocessor card, a smart card, or more generally an electronic module (taking the form of key, a badge, . . . ). This type of module is generally removable and connectable to the decoder. The form with electric contacts is the most widely used, but a connection without contact for example of the type ISO 14443 is not excluded.

A second known form is that of an integrated circuit box, generally placed definitively and irremovably in the decoder. An alternative is made up of a circuit mounted on a base or connector such as a SIM module connector.

In a third form, the security module is integrated into an integrated circuit box also having another function, for example in a descrambling module of the decoder or in the microprocessor of the decoder.

In a fourth embodiment, the security module is not realized as a hardware, but its function is implemented only in software form. Given that in the four cases, the function is identical although the security level differs, we can talk about a security module regardless of the way in which its function is carried out or the form that this module may take.

In the illustrated embodiments, the security module SC is represented in the form of a card of the smart card type. The user's unit is represented as having two readers structured to receive the security module SC and the payment module PP simultaneously. These two readers allow a direct communication between the payment module and the security module. Thus, the data transferred between these two modules are transferred without storage in the user's unit.

If the security module is in a form other than a card, for instance an integrated circuit, it is of course possible to use a user's unit which has only one card reader, this being then used by the payment module PP.

If the security module is in the form of a card, it is also possible to use a multimedia unit which has only one reader. In this case, the data to be transmitted from one module to the other one are first stored in the user's unit, the module having initiated the communication being then removed from the reader to leave place for the other module. This takes the required data from the memory of the user's unit.

FIG. 1 represents the elements allowing the realization of two embodiments of the process of the invention. In the first embodiment described, it is presumed that the user wishes to acquire a credit and that these credits can be acquired in groups of 10 units each. The process according to this embodiment operates in the following way. The user indicates which credit he/she wishes to acquire by means of an input device such as a remote control, an alphanumeric keypad or any appropriate device. This credit request is transmitted to the decoder STB. The decoder STB generates a random number comprised between two values acting as limits, these limits defining the amount of credit required. As an example, a random number comprised between 0 and 1 corresponds to a credit request of 10 units, a random number comprised between 1 and 2 corresponds to a credit of 20 units and so on up to, for instance, an authorized maximum credit of 100 units per transaction.

This random number is transmitted to the security module SC. A control message is formed from a code representing the transaction, namely in this example, from a code corresponding to the amount and from an identifier of the security module requesting this transaction. This control message is transmitted to the payment module PP. This transmission can be made in a decoded or encrypted form. Before validating the transaction, it is verified whether the payment module is entitled to carry out this transaction. To that end, when a credit is requested, it is generally verified whether the balance in the payment module is equal to or higher than the required amount. In such a case, the required credit is debited from the payment module PP and the new amount is stored in the payment module. When this operation is carried out, a receipt message is formed, this message containing at least one value allowing the determination of the amount of credit required and the identifier of the payment module PP. The payment module transfers this receipt message to a management centre CG, in a encrypted way by means of a key specific to this payment module. This message is decrypted by the management centre CG. The latter then determines, according to the payment module identifier, what security module SC is associated to it. This also allows determination of the key or the key pair to be used for encrypting the message at the management centre and to allow its decryption at the security module level. According to an alternative, the receipt can contain an identifier of the security module which has requested the transaction. The management centre then generates an encrypted unlocking code with this key. This encrypted unlocking code is sent to the related STB decoder, then transmitted to the security module SC where it is decrypted. The unlocking code can contain only an authorization information for the required credit or can also include the credit value or an identifier of the related security module.

Figure 5:
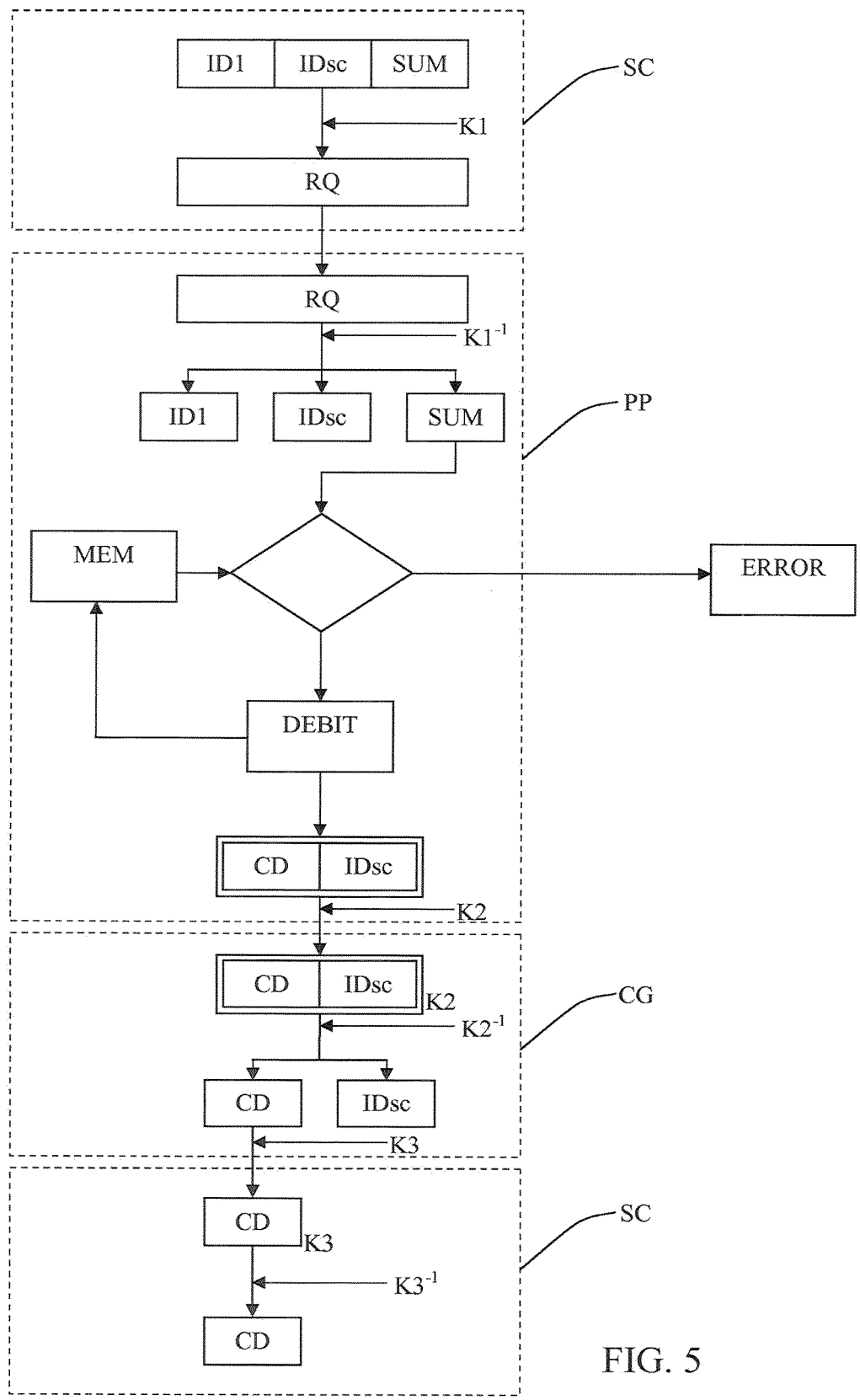
FIG. 5 represents, in a detailed way, the transfer process as schematically represented by FIG. 1.

FIG. 1 also shows a second embodiment of the process of the invention, this second embodiment being also explained in detail with reference to FIG. 5. In this embodiment, it is supposed that the user wishes to acquire the entitlement to visualize a particular event such as a film. This event is linked to an identifier, noted ID1. In particular, the identifier can be available on an electronic programme guide EPG or on a paper support for instance.

Firstly, the user inputs the identifier ID1 of the event that he/she wishes to acquire or selects it from an electronic programme guide (EPG). To that end, he/she uses for instance, an alphanumeric keyboard or a remote control working with a user's unit. Any other similar input device can also be used.

He/she assures him/herself that the security module SC is well connected to the user's unit. It is clear that depending on the kind of security module, this cannot be removed from the user's unit. It is thus permanently connected.

The user's unit then generates a request RQ in the form of a control message, for instance when the user presses a command confirmation key, this message contains at least the amount SUM corresponding to that event or a derivative of that amount. This message can also optionally contain the identifier ID1 of the ordered event. According to a preferred embodiment, the control message also contains an identifier IDsc of the security module SC which has emitted the request or an identification number.

The control message is encrypted by means of a key K1 known from the security module. This encrypted message is transmitted to the payment module PP. This payment module also has the key K1 or, in the case of an asymmetric key pair, the corresponding key, also noted K1 for simplification purposes. It is also possible to add a verification code so as to avoid problems due to eventual transmission errors.

The control message is then decrypted by the payment module PP by means of the corresponding key. The amount SUM is extracted from the decrypted message. The payment module PP verifies that the amount contained in the message is equal to or lower than the balance stored in the payment module. If this were not the case, the amount is not debited and an error message is sent back to the management centre.

On the contrary, if the balance is sufficient, the amount SUM is debited from the balance, possibly after other verifications such as those verifications related to parental control or to other entitlements related to the event or to the security module. The new balance is stored in the payment module PP.

When this debit operation is carried out, a receipt is generated. This receipt can be in the form of a unlocking code CD encrypted by means of a key K2 which is known by the payment module PP and the management centre CG. The receipt also contains an information allowing the identification of the security module which has emitted the request or the control message. This information is usually the identifier IDsc of said security module. The receipt is authenticated so as to avoid the possibility of a fraudulent receipt being transmitted to the security module and unjustified delivery of a credit.

The receipt is sent to the management centre CG where it is decrypted. Thus, the management centre processes the receipt message so as to determine which security module SC emitted the request and obtain the unlocking code.

As the management centre knows the emitter of the control message, it can determine which key to use in order to encrypt a message intended for that module. Thus, it encrypts the unlocking code with the aid of a key K3 of the related security module SC and sends this encrypted unlocking code to that module. The latter can thus decode it and extract the unlocking code CD from there. The latter is then used for allowing the access to the necessary contents, this access being possibly done in various ways. One possible way is that the unlocking code is a key allowing access to the control messages ECM or to management messages EMM.

In this embodiment, the security module SC and the payment module PP can share common secret information, which is the key K1 in the present case. It is entirely possible to allow several or all the payment modules of a certain batch to share the same key K1. Indeed, even if the coded request is sent to a payment module other than that to which it is intended, the fact that the identifier is integrated in the request ensures that the unlocking code will be transmitted to the correct security module.

It is also possible to automatically detect the security module having emitted the request, without the user having to input the identifier.

The unlocking code is only sent after debiting the payment module amount, so as to avoid the same receipt message being used several times without having executed the corresponding debit.

In the above description, it has been indicated that the security module requires a particular event or a group of events, indicated by an identifier ID1 contained in the control message. It is also possible not to order a particular event, but rather an amount, for instance. This amount could then be used by the security module to access any event. In this case, the payment module functions as an electronic wallet. This situation does not change the principle of the process, since it suffices to send only the requested amount SUM and not an event identifier.

Figure 2:
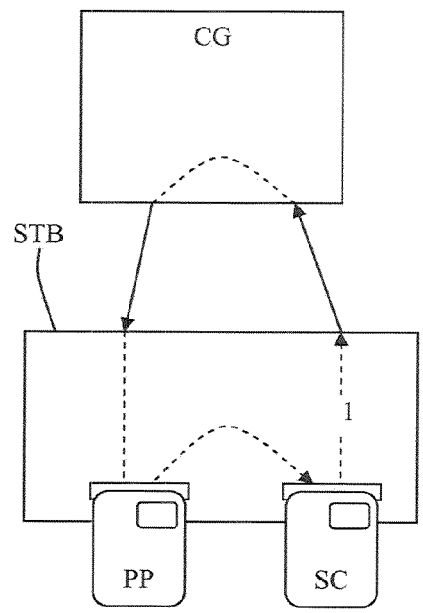
Figure 6:
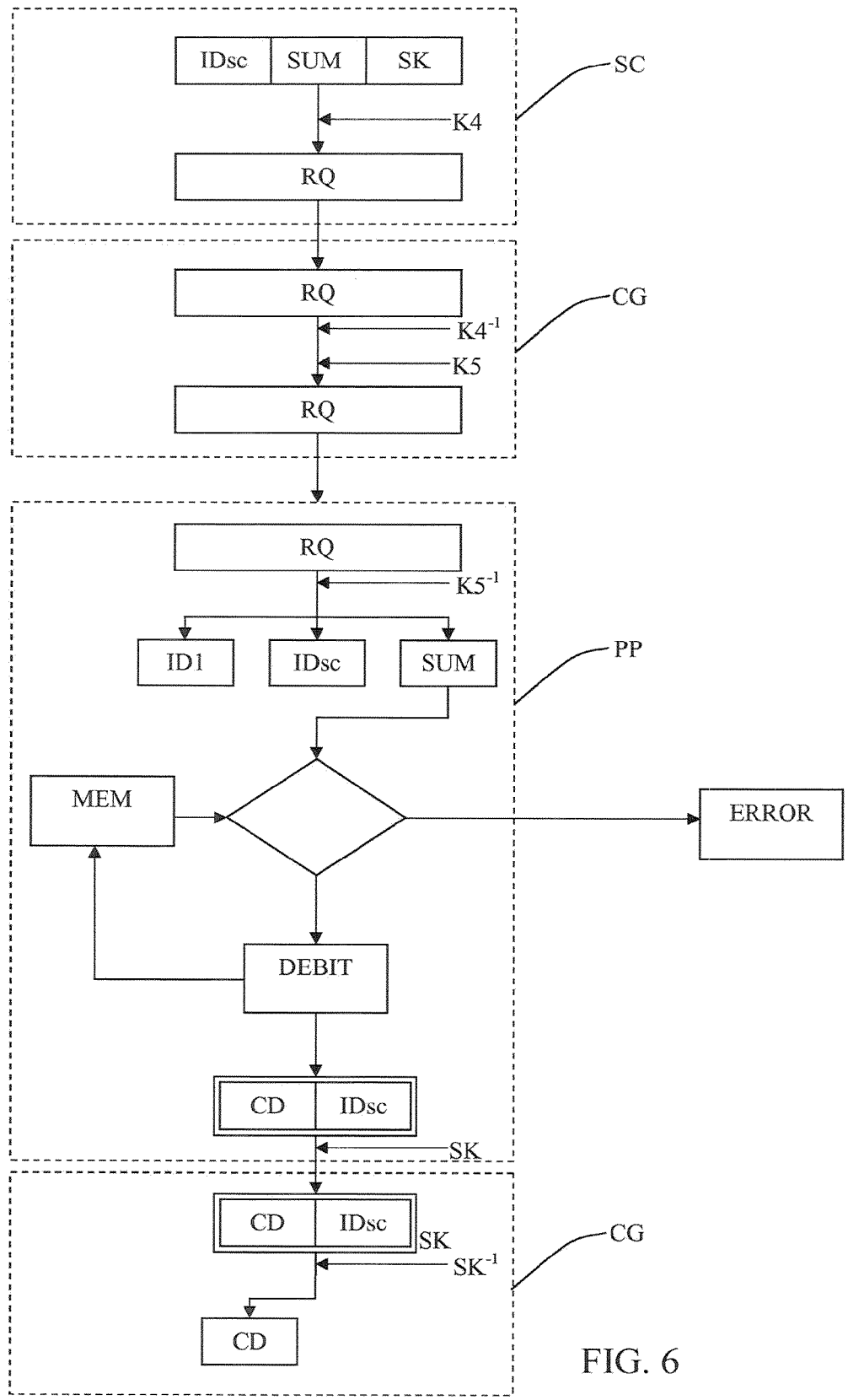
FIG. 6 represents, in a detailed way, the transfer process as schematically represented by FIG. 2.

FIGS. 2 and 6 illustrate an alternative of the process according to the invention whereby the security module sends a request to the management centre. In the chosen example, the request is not made for a particular event, but for a certain amount. This request thus contains an amount SUM and an indication IDsc allowing the identification of the security module making such a request. In a variation of the invention, this request also contains a session key SK, whose utility will be explained below. All of these elements can be encrypted by means of a key K4 known by the management centre CG. The message is sent to the management centre in this form.

It decrypts the message, if necessary, by means of the key K4, then re-encrypts it by means of a key K5, known by the payment module associated with the security module which has emitted the request. The thus encrypted message is sent to the payment module, which decrypts it using the key K5. This decryption permits to obtain information relating to the requested event and its cost in particular, which allows the carrying out of a verification and the debiting of the necessary amount if the balance stored in the payment module is sufficient. The decryption also allows reception of the session key emitted by the security module. This key is used to encrypt the unlocking code CD and send it to the security module. Of course, the latter has the session key, that allows the decryption of the unlocking code and access to the requested contents.

In an alternative where the control message or the request is addressed to a particular event or a group of events, it is possible to transmit the amount relating to the desired event in said message. It is also possible to not transmit the amount in this request, but to allow the management centre to associate the event to the amount. This can be interesting in particular when the amount for a same event varies depending on the entitlements which are specific to the security module emitting the control message.

According to another alternative, it is possible to use a common key at the security module and at the payment module instead of the session key. However, the use of a session key presents the advantage that the security module and the payment module does not need to share common secret information in order, to be able to communicate.

The session key is used for only one communication, then it is deleted. This avoids risks relating to an abusive use of the keys.

Figure 3:
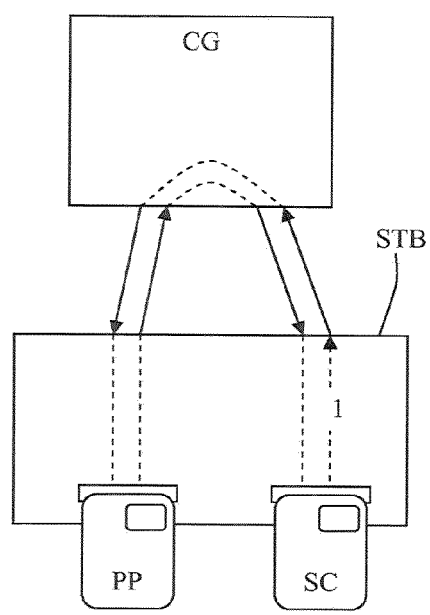

In the embodiment of FIG. 3, the communication of the security module SC to the payment module PP takes place in a similar way to that described with reference to FIGS. 2 and 5. The control message is sent to the management centre CG, this request is eventually encrypted by a key known to said management centre. However, in principle, the message transmitted to this management centre does not contain a session key. The message is decrypted by the management centre, then re-encrypted by the latter by means of a key which is known by the payment module PP. Then it is sent to said payment module.

The payment module decrypts the received message, verifies if the balance is sufficient and, if necessary, debits the amount.

The unlocking code is not directly transmitted from the payment module to the security module SC. This unlocking code CD is first sent from the payment module PP to the management centre CG, the said code being encrypted. The code is then decrypted in the management centre, then re-encrypted before being transmitted to the security module SC. The code is then decrypted so it can be used to access the requested content.

This embodiment has the advantage that it is possible to transmit data between the security module and the payment module without having to share common secret information. All the communications between the security module SC and the payment module PP transit via the management centre CG.

Figure 4:
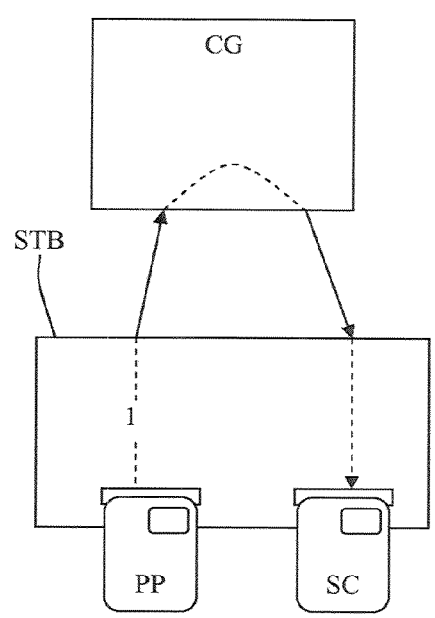

In the embodiment illustrated in FIG. 4, the security module SC does not initiate the communication. The latter is initiated by the payment module PP. This can be done particularly, but not only, when a credit is transferred from the payment module to the security module.

In this embodiment, an unlocking code CD containing the credit SUM to transfer as well as an identifier IDsc of the security module to which this credit has to be transferred is generated by the payment module. This unlocking code is encrypted by a key known by the management centre and the encrypted message is sent to this management centre. It decrypts it and extracts the identifier IDsc of the related security module. Then, it re-encrypts the unlocking code CD by means of a key specific to the security module, then it sends this encrypted code. The security module decrypts it and then it can use the unlocking code to credit the requested amount.

This embodiment is not optimal regarding security because there is not any communication between the security module and the payment module, but it could be used in applications where security is not primordial.

In the different embodiments described, it is assumed that there is direct communication between the security module and the payment module, either the multimedia unit has two readers, or the security module is integrated in the multimedia unit. In practice, if the security and payment modules have the form of chip cards and the multimedia unit only has one card reader, it is possible to store the content of the messages in a multimedia unit memory, then to place the requested module in the reader and transfer the content from the memory to the module which is inserted in the reader at that moment.

The invention claimed is:

1. A process for carrying out a transaction, said process comprising:
    receiving, by a hardware decoder, an indication that a transaction to be carried out between a payment module connected to the hardware decoder and a security module connected to the hardware decoder has been requested, said indication including a transaction identifier, the security module being configured to perform conditional access operations;
    generating by the hardware decoder a control message containing at least a representative code representing said transaction and an identifier of the security module;
    sending said control message to said payment module;
    verifying in said payment module whether the payment module is entitled to carry out the transaction;
    executing the transaction by the payment module, storing a result of the transaction in said payment module, and generating by the payment module a receipt relating to the transaction and to the security module;
    sending by the hardware decoder said receipt to a management center;
    receiving an unlocking code at the security module from the management center, said unlocking code being based on the receipt; and
    registering the transaction in said security module.

2. The process of claim 1, wherein the control message is stored in the hardware decoder before being sent to the payment module.

3. The process of claim 1, wherein the receipt is encrypted using a key that the management center is able to determine.

4. The process of claim 1, wherein the receipt is sent to the management center in encrypted form.

5. The process of claim 1, wherein the unlocking code is formed from said receipt.

6. The process of claim 1, wherein the transaction concerns at least one the element selected from among the group consisting of an event access entitlement, a data access entitlement, and a credit.

7. A process for carrying out a transaction, said process comprising:
    receiving, by a hardware decoder, an indication that a transaction to be carried out between a payment module and a security module connected to the hardware decoder has been requested, said indication including a transaction identifier, the security module being configured to perform conditional access operations;
    generating by the hardware decoder a control message containing at least a representative code representing said transaction and an identifier of the security module;
    sending said control message by the hardware decoder to a management center;
    receiving said control message from the management center at the payment module;
    verifying in said payment module whether the payment module is entitled to carry out the transaction;
    executing the transaction and transmitting an unlocking code relating to the transaction to the corresponding security module; and
    registering the transaction in said security module.

8. The process of claim 7, wherein the transaction concerns at least one element selected from among the group consisting of an event access entitlement, a data access entitlement, and a credit.

9. The process of claim 7, wherein the control message is sent in encrypted form to the management center.

10. The process of claim 7, wherein the control message is decrypted by the management center.

11. The process of claim 7, wherein the unlocking code is stored in the hardware decoder.

12. A process for carrying out a transaction, said process comprising:
    receiving, by a hardware decoder, an indication that a transaction to be carried out between a payment module and a security module connected to the hardware decoder has been requested, said indication including a transaction identifier, the security module being configured to perform conditional access operations;
    generating by the hardware decoder a control message containing at least a representative code representing said transaction and an identifier of the security module;

sending by the hardware decoder said control message to a management center;

receiving said control message from the management center at the payment module;

verifying in said payment module whether the payment module is entitled to carry out the transaction;

executing the transaction and transmitting a receipt relating to the transaction to the management center;

receiving an unlocking code from the management center at the security module, said unlocking code being based on the receipt; and registering the transaction in said security module.

13. The process of claim 12, wherein the receipt is sent in encrypted form to the management center.

14. The process of claim 12, wherein the unlocking code is formed from said receipt.

15. The process of claim 12, wherein the transaction concerns at least one element selected from among the group consisting of an event access entitlement, a data access entitlement, and a credit.

16. The process of claim 12, wherein the control message is decrypted by the management center.

17. The process of claim 12, wherein the unlocking code is stored in the hardware decoder.

18. A process for carrying out a transaction, said process comprising:

receiving, by a hardware decoder, an indication that a transaction to be carried out between a payment module and a security module connected to the hardware decoder has been requested, said indication including a transaction identifier, said security module being configured to perform conditional access operations;

generating, by the payment module, a control message containing at least a representative code representing said transaction;

verifying in said payment module whether the payment module is entitled to carry out the transaction;

executing the transaction, storing the result of the transaction in said payment module, and generating a receipt by the payment module relating to the transaction and to the security module;

sending said receipt to a management center;

receiving an unlocking code at the security module, said unlocking code being based on the receipt; and registering the transaction in said security module.

19. The process of claim 18, wherein the receipt is sent in encrypted form to the management center.

20. The process of claim 18, wherein the unlocking code is formed from said receipt.

21. The process of claim 18, wherein the transaction concerns at least one element selected from among the group consisting of an event access entitlement, a data access entitlement, and a credit.

22. The process of claim 18, wherein the unlocking code is sent in encrypted form to the security module.

* * * * *